United States Patent
Rice

[15] 3,679,151
[45] July 25, 1972

[54] LINE TRANSFER APPARATUS

[72] Inventor: Harold D. Rice, 3404 W. 85th St., Leawood, Kans. 66206

[22] Filed: June 1, 1970

[21] Appl. No.: 42,353

[52] U.S. Cl. ..........................................242/85, 242/84.2 R
[51] Int. Cl. ..........................................................A01k 89/00
[58] Field of Search..................242/84.1 R, 84.1 K, 84.2 R, 242/84.2 A, 84.21 R, 84.21 A, 104, 106, 129.5, 129.7, 129.71, 129.72, 134, 128, 140, 141, 84.5, 85

[56] References Cited

UNITED STATES PATENTS

| | | | |
|---|---|---|---|
| 3,026,059 | 3/1962 | Dennler | 242/84.5 R |
| 1,846,524 | 2/1932 | Lindsay | 242/128 |
| 2,963,238 | 12/1960 | Gaire | 242/84.1 K |
| 769,548 | 9/1904 | Laughton | 242/104 |
| 1,066,226 | 7/1913 | Rosenberg | 242/129.71 X |
| 1,656,464 | 1/1928 | Auren | 242/141 |
| 2,239,226 | 4/1941 | Graham | 242/141 |
| 2,643,075 | 6/1953 | Moore | 242/128 |
| 2,848,778 | 8/1958 | Plummer et al. | 242/84.1 R X |
| 3,312,418 | 4/1967 | Haddock | 242/85 |

*Primary Examiner*—Billy S. Taylor
*Attorney*—Don M. Bradley

[57] ABSTRACT

A line transfer apparatus which includes a clamp mounting a shaft in substantial alignment with the axis of a spinning reel. The shaft carries a crank comprising a tube telescoped over the shaft and an arm extending radially therefrom. The arm has line guiding notches for lifting the line from a supply spool mounted on the tube as the arm, tube and supply reel are rotated as a unit on the shaft by the force exerted by the line on the arm during rotation of the reel line pick-up device. A friction brake yieldably resists relative rotation between the supply reel and the tube but permits such relative rotation responsive to tension in the line due to unequal diameters of the supply spool and stationary reel spool during the line winding operation.

14 Claims, 8 Drawing Figures

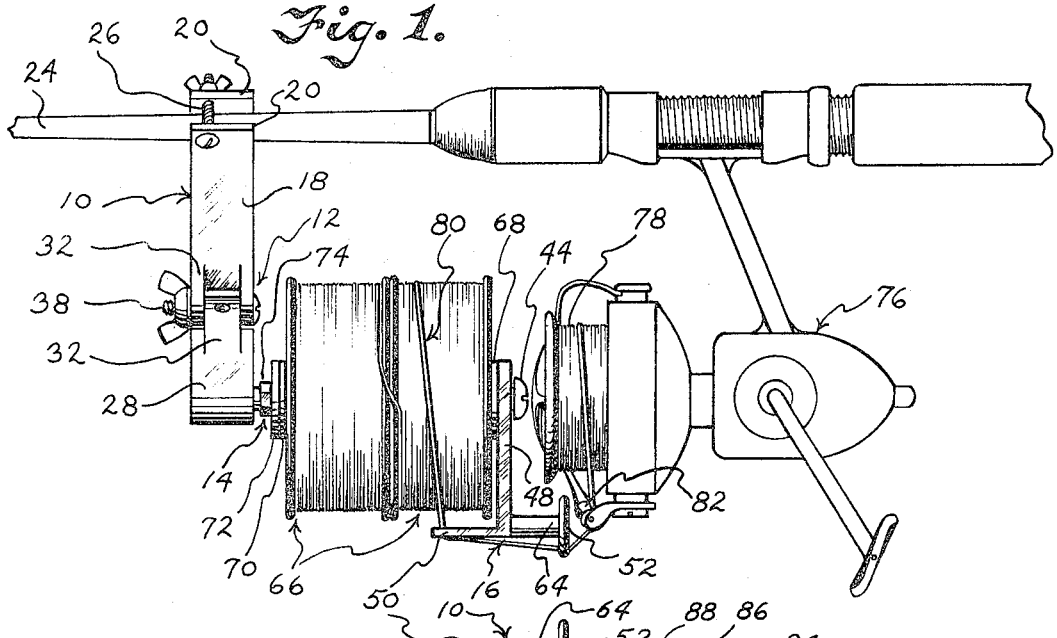
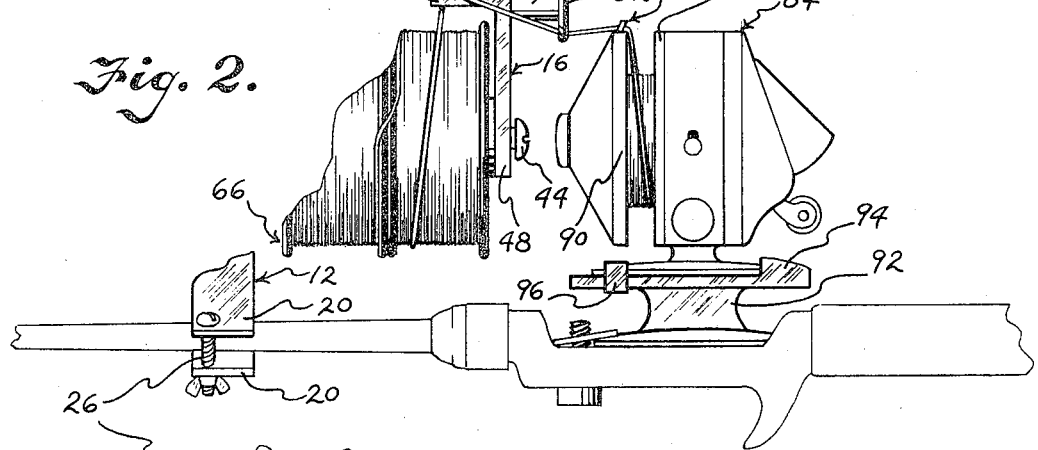
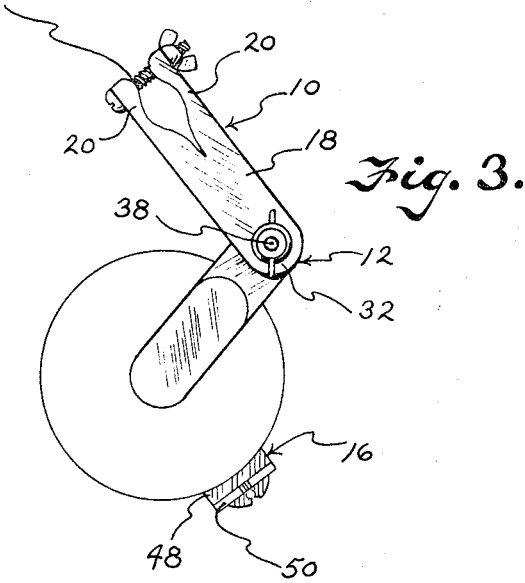

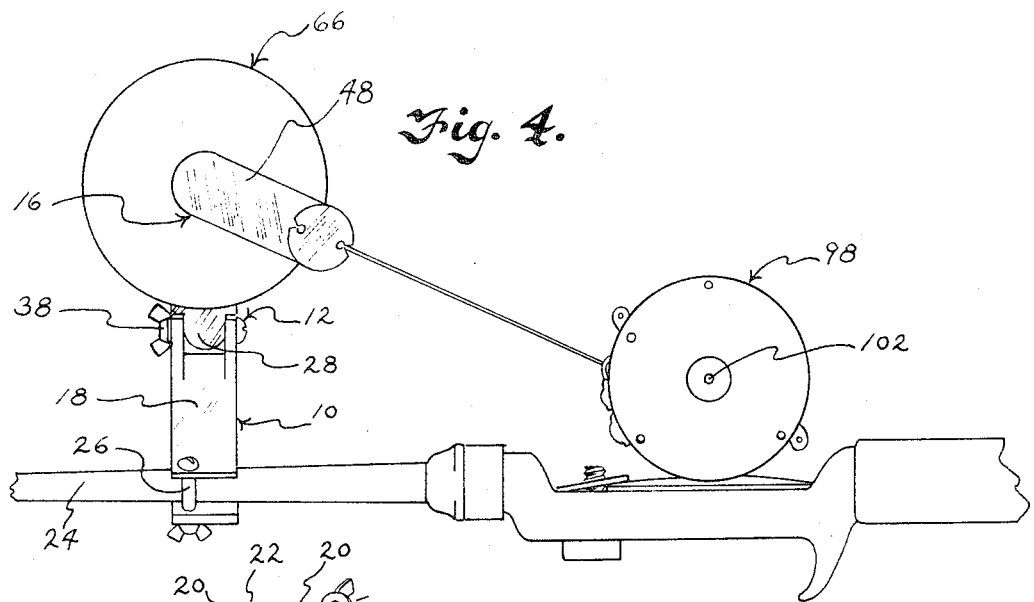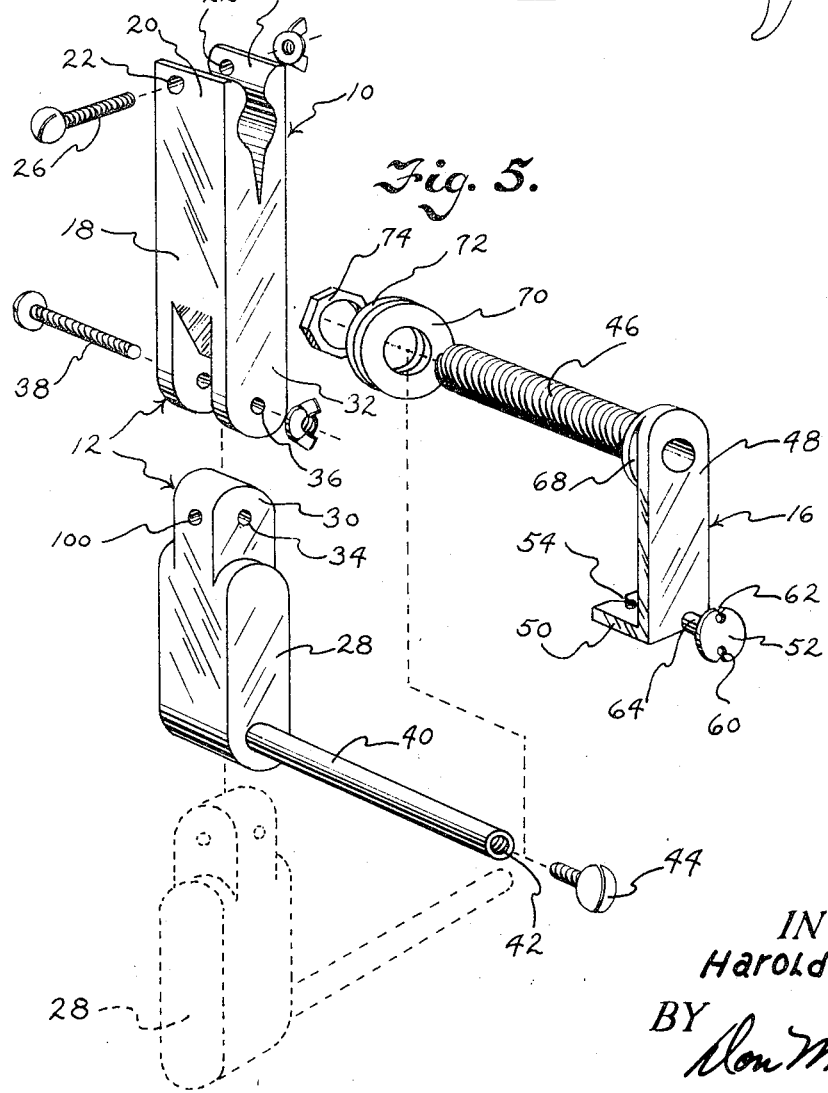

PATENTED JUL 25 1972 3,679,151
SHEET 3 OF 3
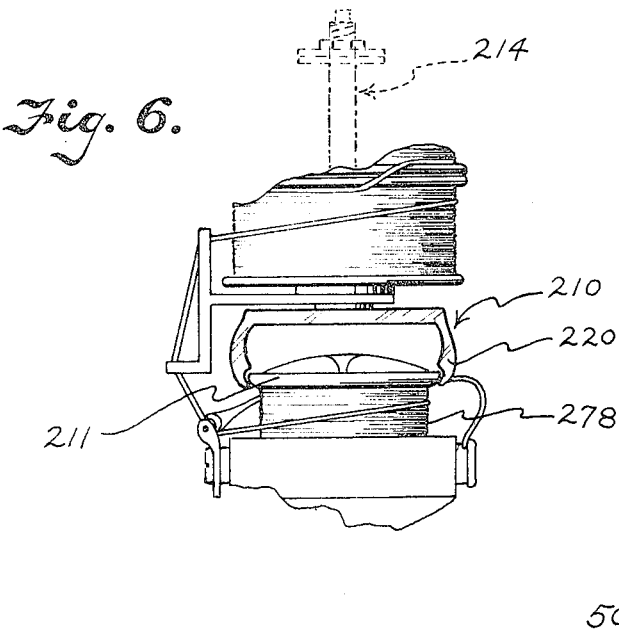
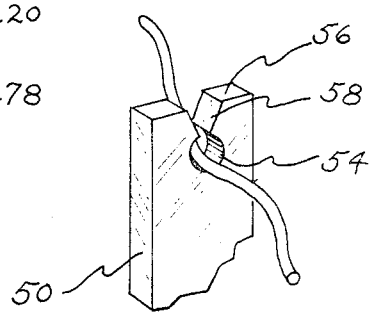
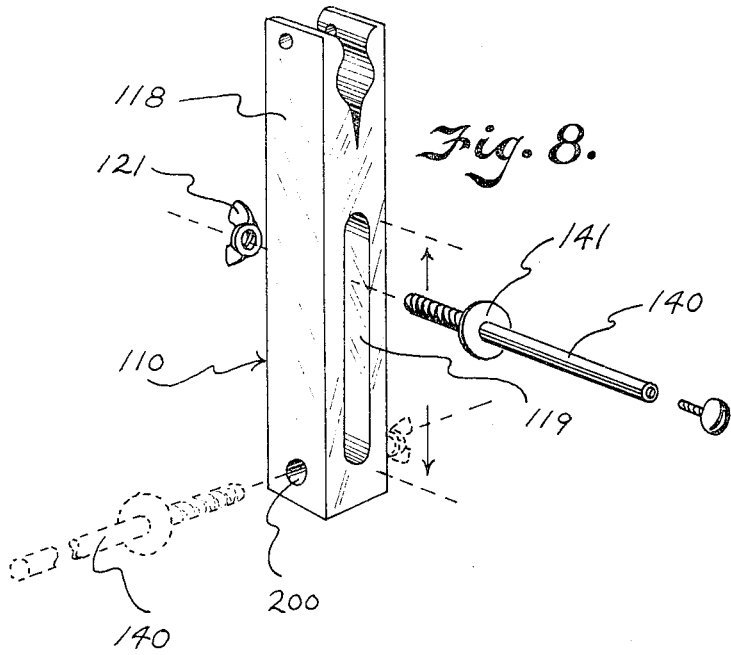
INVENTOR
Harold D. Rice
BY Don M. Bradley

LINE TRANSFER APPARATUS

This invention relates to line winding apparatus, and more particularly, to an attachment for use in transferring line from a bulk spool to the spool of a line winding reel. The form of the invention disclosed in this application is especially well suited for use in installing line on spinning type fishing reels. It is versatile enough for use in installing line on any type finishing reel and also in transferring the line from the reel back onto the supply spool.

Replacement of monofilament line onto the stationary spool of spinning reels presents substantial line twist problems. Successful operation of the reel requires, however, that the line be as free from twists as possible.

One often advocated method for loading line onto the stationary spinning reel spool involves holding the axis of the supply spool parallel with the axis of the reel spool. Spirals of the line are drawn off the end of the supply spool as the line is wound on the reel spool. However, differences in the diameters of the two spools usually produce some line twisting even when care is exercised in practicing this method. Also, there is the ever present possibility that the supply reel may be oriented in a manner to produce a double twist in the line when filling a reel by this method. Often the fisherman is not able to properly hold the supply spool, wind the reel handle, maintain proper line tension and compensate for differential spool diameters all at the same time.

Apparatus has heretofore been suggested for overcoming these difficulties in applying line to spinning reels. One such device comprises a frame which is attached to the rotating head of a spinning reel. It is only effective when it is attached to this movable component of the reel. It is extremely difficult to use because rotation of the reel head subjects the device to relatively easy dislodgment from the head. The utility of this device is limited to spinning reels and it cannot be used for putting line on a casting reel nor can it be used to remove line from any type of reel.

Accordingly, it is a primary object of this invention to provide an easy to use, versatile, highly reliable apparatus for twist free transfer of line from a supply spool to a reel spool, and which is free of the other problems which have plagued line transfer methods and apparatus in the past.

In accomplishing the foregoing object, it is an object of the invention to provide an attachment which a fisherman may easily and successfully use for installing or removing line from any type of fishing reel.

A further object is to provide a relatively light weight, durable apparatus of this type adapted for compact storage in a tackle box or the like.

Another object of this invention is to provide an attachment which insures that the line is removed from the supply spool and is applied to the reel spool substantially at right angles to the respective spools, thereby insuring relatively uniform wrapping of the line on the reel spool without twisting the line.

Still a further object of the invention is to provide apparatus which automatically compensates for differences in the effective diameters of the respective spools to maintain uniform, twist free tension in the line at all times.

It is a very important object of the present invention to provide a line transferring apparatus which requires no physical connection with any moving parts of the reel so that there need be no concern that the apparatus will become inadvertently disengaged from its installed position during the line transferring operation.

These and other important objects of the invention will be further explained or will be apparent from the description, claims and the drawings.

In the drawings:

FIG. 1 is a side elevational view of apparatus embodying the principles of this invention installed in operating position on a fishing rod equipped with an open face spinning reel, the rod being shown fragmentarily;

FIG. 2 is a fragmentary view similar to FIG. 1 but showing the apparatus in use with a closed face spinning reel;

FIG. 3 is a front end elevational view of the apparatus;

FIG. is a view similar to FIGS. 1 and 2 but illustrating how the apparatus may be used to transfer line to a casting reel;

FIG. 5 is an enlarged, exploded perspective view of the apparatus, an alternate position of the shaft appearing in dash lines;

FIG. 6 is a top plan view of a modified form of the apparatus adapted for installation directly on the stationary reel spool, the reel and supply appearing fragmentarily and a portion of the axle appearing in dash lines for clarity;

FIG. 7 is an enlarged, fragmentary perspective view of an arm element illustrating the line guide; and FIG. 8 is a view similar to FIG. 5 but showing an alternate construction for adjusting the spindle position.

Apparatus embodying the principles of this invention is broadly designated in FIGS. 1–5 of the drawings by the reference numeral 10 and includes a mounting bracket 12, an axle 14 and a line guiding arm 16 in the nature of a crank swingable on the axle.

Bracket 12 includes an elongated member 18 which is bifurcated at one end to present a pair of spaced apart clamp jaws 20 each having an aperture 22 extending therethrough as illustrated clearly in FIG. 5. The inner facing surfaces of the jaws 20 are preferably contoured as illustrated in the drawing to permit the insertion of a fishing rod 24 between the jaws. It is also preferred that the apertures 22 be disposed off center with respect to the respective jaws 20 so that the latter will complementally embrace the tapered outer surface of the rod 24 when the jaws are clamped together by a fastener such as the bolt 26.

Bracket 12 also includes an elongated member 28 which is hinged to the end of member 18 remote from the clamp. To this end, member 28 has a longitudinally extending projection 30 adapted to be received between a pair of projecting hinge elements 32 on the end of member 18 remote from the clamp. A hole 34 in projection 30 is alignable with a pair of holes 36 in the hinge elements 32 and a bolt 38 interconnects members 18 and 28 for swinging movement about the axis of the bolt.

The hole 34 extends parallel with an elongated shaft 40 projecting from one side of member 28. The outermost end of shaft 40 has an internally threaded bore 42 adapted to receive a fastener in the nature of a screw 44 for holding the remaining components assembled to the shaft as will subsequently be apparent.

Arm 16 includes an externally threaded elongated tube or axle 46 adapted to be telescoped over shaft 40. Tube 46 is integral with an elongated radially extending arm member 48. Member 48 carries a pair of integral line guiding elements 50 and 52 adjacent the outermost end of the arm. Element 50 projects toward the free end of tube 46 in radially spaced relationship therefrom and a line guiding aperture 54 communicates with the outermost projecting end 56 of element 50 by means of a V-shaped slot 58 (FIG. 7).

A pair of oppositely positioned comparably slotted apertures 60 and 62 are provided in element 52 which is in the form of a disc as shown clearly in FIG. 5. It should be noted that element 52 is spaced outwardly from member 48 by a spacer 64 projecting in the opposite direction from element 50. It should be pointed out at this juncture that aperture 62 is located radially inwardly from aperture 60.

Prior to assembly of arm 16 on bracket 12, a bulk line supply spool 66 is telescoped over tube 46. A washer 68 is interposed between arm member 48 and the proximal face of the spool. Another washer 70, preferably constructed of frictionable material, is interposed between the opposite face of spool 66 and a washer 72 which is formed preferably of metal or other substance harder than the material of washer 70. The spool is locked on tube 46 by a lock nut 74 threadably engaged on tube 46. The resistance against rotation of spool 66 on tube 46 is provided by the clamping action imparted by nut 74 forcing washer 70 against the proximal spool face. Manifestly, the resistive force can be varied as desired to provide proper line tension during operation of the apparatus.

Bracket 10, when installed on a fishing rod provided with an open face type fishing reel 76 as illustrated in FIG. 1, is articulated at the hinge to swing axle 14 (comprising shaft 40 and tube 46) into substantial alignment with the axis of the fixed spool 78 of the reel. The alignment of bolt 38 with the axle permits the movement of the axle quickly into alignment with the reel axis. Further, wing nut means for both bolts 38 and 26 facilitate rapid installation and adjustment of the apparatus into the desired operating position.

Line 80 from spool 66 is threaded through the aperture 54 of element 50, aperture 60 of element 52, through the line pick-up device 82 of reel 76 and onto the fixed spool 78.

With the apparatus 10 in the position shown in FIG. 1 of the drawing, rotation of the reel handle draws line from spool 66 which is then wound onto the reel spool. As the pick-up 82 revolves in its path of travel concentric with the spool axis, arm 16 is swung by the line in a circular path of travel around the axis of shaft 40. Tube 46 is freely rotatable on the shaft but the friction imparted to spool 66 by the clamping of the washers and retaining nut provides a braking action to limit the relative rotation of spool 66 on tube 46.

Spool 66 is positioned on apparatus 10 so that line 80 is taken off the spool in exactly the opposite direction from that in which it was wound onto the spool. As pick-up 82 winds the line onto the fixed reel spool, arm 16 and the elements 50 and 52 are drawn by the line through the circular path of travel substantially aligned with device 82. This insures that the guide of element 50, projecting over the spool, draws the line substantially at right angles from the axis of spool rotation. Further, element 54 and its line guide locates the line proximal pick-up 82 in proper position for transfer of the line onto the fixed reel spool. Here again, the guide holds the line at substantially a right angle from the axis of the reel spool.

The spool 66 chosen for illustration is a double spool. It will be apparent to those skilled in the art that a single spool or even any appropriate number of spools could just as well be utilized with this apparatus. In such event, the nut need only be threaded further down the tube 46 to clamp the single spool in a manner comparable to that described with respect to the double spool.

The winding of the line onto the fixed reel spool and the withdrawal of the line from the supply spool both are in a direction opposite to the direction of application of the line to the supply spool. Theoretically, if the diameters of the reel spool and supply spool remained constant and were identical, there would need be no rotation of the supply spool with respect to arm 16. However, such is never the case and the diameter of the supply spool is normally greater than that of the reel spool. Further, the effective diameter of the reel spool continues to increase as line is wound onto the spool while the effective diameter of the supply spool continues to decrease.

Differences between the spool diameters is accommodated by slippage of the spool against washers 68 and 70. This permits limited rotation of spool 66 on tube 46 so that the line is wound onto the reel spool at a substantially uniform tension and substantially free from any line twist.

FIG. 2 illustrates the use of apparatus 10 for transferring line from the supply spool to a closed face type reel 84. The normally present reel cover (not shown) is removed and the line is wound onto the fixed reel spool 86 in exactly the same manner described with respect to FIG. 1. Since, however, the pick-up for reel 84 comprises a projecting pin 88, it is necessary that the line be held against the pin during the winding operation. Accordingly, the radially inwardly positioned aperture 62 of element 52 is used for guiding the line. Since the circular path of travel of aperture 62 is of lesser diameter than the diameter of the annular rim 90 of the reel pick-up device, there is little danger of the line becoming disengaged from the pick-up pin 88.

Closed face type reels sometimes are used with rods having offset type handles as shown in FIG. 2. In this case, a spacer bracket 92 may be interposed between the reel and the rod so that the axis of the reel spool can be readily aligned with the axis of shaft 40. Spacer 92 comprises a pedestal adapted to be secured to the fastening means provided for the rod handle. A projection 92 has a slot (not shown) adapted to receive the heel of the reel mounting foot and the toe is received under the sliding latch 96.

Apparatus 10 may also be used to transfer line from a bulk spool to a bait casting reel 98 of the type illustrated in FIG. 4. To this end, projection 30 of bracket member 28 has an aperture 100 extending perpendicularly to aperture 34. This permits removal of the member 28 at the hinge joint and reattachment to member 18 in a position with shaft 40 rotated 90° from the initial position as shown in FIG. 5 in dash lines. Such construction permits alignment of the axis of the supply spool 66 parallel with the axis 102 of the spool of reel 98. The line can then be wound onto reel 98 with the line passing through the line guides as described above. It will be understood, however, that arm 16 does not rotate when the apparatus is used for transferring line to a bait casting reel as illustrated in FIG. 4.

An alternate embodiment of the mounting bracket is designated by the reference numeral 110 in FIG. 8 of the drawing. In this case, the bracket 110 is of one-piece construction and the member 118 has an elongated, transversely extending slot 119 adapted to accommodate the shaft 140 in any desired position to align the shaft with the reel axis. A radially extending flange 141 integral with shaft 140 embraces one edge of member 118 while the other edge of the latter is embraced by a wing nut 121 threadably secured to the thread end of shaft 140.

An aperture 200 extends through member 118 at right angles to slot 119 and permits installation of the shaft 140 in the position shown in dash lines. This position, of course, permits disposition of the supply spool axis parallel with the reel spool axis for transferring line to a bait casting reel.

It is to be emphasized that apparatus 10 is adapted to mount the supply spool and the apparatus on a relatively fixed support. There is no physical connection (other than by the line) with any moving part of the reel. The connection of the apparatus into a relatively stable position with respect to the reel is normally through the fishing rod. However, the attachment might be through a clamp 210 having a pair of resilient arms 220 adapted to complementally grip the outermost reel 211 of the fixed reel spool 278. The axle 214 is mounted directly on clamp 210, obviating the need for a bracket extending from the axle to the rod. Operation and construction of the apparatus illustrated in FIG. 6 is similar to that heretofore described except for the substitution of clamp 210 for the mounting bracket.

All forms of the invention with the exception of the form shown in FIG. 6 may be used for replacement of line from the reel spool back onto the supply spool. The shafts 40 or 140 are positioned in their respective brackets so that the shafts extend parallel with the reel spool axes. The mounting bracket is moved on the rod to dispose the supply spool over or along side the corresponding reel spool. The line extends directly from the reel spool to the supply spool without passing through the line guides.

The operator then grasps the projecting line guide element 52 which serves as a convenient handle for winding the line onto the supply spool. Manifestly, the braking force between the reel spool and its mounting tube is increased by adjustment of nut 74 so that swinging of arm 16 about axle 14 rotates the supply spool to wind the line.

The construction of the apparatus of this invention is particularly well suited for easy disassembly, folding and reassembly so that a fisherman can readily store and carry the apparatus in a tackle box or the like when not in use. Every effort has been made to simplify the construction consistent with maintaining reliable performance in transferring line free from the hazards of objectionable line twist. The parts of the apparatus are adapted for relatively economical fabrication from durable, yet light weight, plastic material by injection molding or other available techniques.

While the invention has been shown and described with particular reference to fishing apparatus, it will be recognized by those skilled in the art that it could be used for other purposes.

Having thus described the invention, what is claimed as new and desired to be secured by Letters Patent is:

1. Apparatus for transferring a continuous line from a supply spool to a reel provided with a winding device movable on a circular path of travel, said apparatus comprising:
   an axle adapted to rotatably receive the spool;
   means mounting the axle for rotation about its longitudinal axis;
   spool rotation retarding means on the axle and disposed to engage said spool when the latter is received on the axle to retard free rotation of the spool relative to the axle while permitting said relative rotation under the influence of tension applied to said line sufficient to overcome the retarding action of said retarding means;
   an elongated arm rigidly secured to the axle for rotation therewith and extending radially therefrom, said arm including line guide means,
   said means mounting the axle being disposed for movement of the guide means along a path of travel substantially concentric with the path of travel of the winding device and radially outwardly of the spool, whereby the line extending through the guide means and operably engaged by the winding device swings the arm about the axis of the axel to avoid twisting of the line as the latter is drawn from the spool by tension applied to the line by said device.

2. The invention of claim 1, wherein said retarding means includes friction means adapted to engage the spool for frictionally resisting said free rotation of the spool on the axle means as the line is drawn from the spool.

3. The invention of claim 1, wherein the guide means includes a pair of elements carried by the arm and projecting in either direction from the longitudinal axis of the latter, the spool on the axle extending beneath one projection and the other projection extending toward the device, and a guide for each element respectively, one guide being disposed in outwardly spaced relationship from the spool and the other guide being disposed between the arm and the device.

4. The invention of claim 3, wherein each of said elements has a line guiding aperture extending therethrough, and wherein the elements each have slits extending from the respective apertures to the edges of the corresponding elements, said slits being adapted for ready insertion and removal of the line into and from the corresponding apertures.

5. The invention of claim 1, wherein the winding device is mounted on a support, and wherein said axle mounting means includes a pair of elongated members, means pivotally interconnecting said members adjacent their ends, a clamp carried by the other end of one of the members and adapted for releasable attachment to said support, the axle being carried by the other member, whereby the members may be swung with respect to one another to selectively vary the position of the axle.

6. The invention of claim 5, wherein said interconnecting means includes a hinge, said hinge including components operable to permit selective articulation of the members about a pair of axes at right angles to one another.

7. The invention of claim 1, wherein said axle mounting means includes adjustable means for selectively varying the position of the axle to permit axial alignment of the axle with the axis of the reel spool to accommodate variations in the diameters of reel spools.

8. The invention of claim 7, wherein the winding device is mounted on a support, and wherein said axle mounting means includes an elongated member provided with a longitudinally extending slot through the member, a clamp carried by one end of said member and adapted for releasable attachment to said support, the axle means including a portion extending through the slot, and means releasably securing the axle at any selected position with respect to the ends of the slot, whereby to permit adjustment of the axle position.

9. An attachment for a fishing rod to facilitate transfer of line from a supply spool to the stationary spool of a spinning reel having a line pick-up revolvable co-axially about the stationary spool, said attachment comprising:
   an elongated axle;
   a tube telescoped over the axle for substantially free rotation thereon, said tube being adapted to receive the supply spool with the latter telescoped over the tube for rotation thereon;
   spool rotation retarding means on the tube and disposed to frictionally engage the spool to retard rotation of the latter relative to the tube while permitting said relative rotation under the influence of tension applied to said line;
   means adapted to releasably mount the axle to the rod with the axle projecting from said mounting means in substantial alignment with the axis of the stationary spool and spaced radically from the rod;
   an arm integral with the tube at one end thereof and extending radially therefrom for swinging adjacent the free end of the axle for movement through a circular path of travel between the supply spool and the reel;
   means on the arm for carrying a loop of the line around the supply spool responsive to revolving of the pick-up about the stationary spool, whereby the supply spool is rotated on the shaft to avoid twisting of the line as the latter is drawn from the supply spool by tension applied to the line by the revolving line pick-up.

10. The invention of claim 9, wherein said axle mounting means includes structure secured to the axle and adapted to engage the stationary reel for releasably fastening the axle to the stationary spool of the reel, the mounting of the axle to the rod being through said reel.

11. An attachment for a fishing rod to facilitate transfer of line from a supply spool to the stationary spool of a spinning reel having a line pick-up revolvable co-axially about the stationary spool, said attachment comprising:
   an elongated shaft;
   means adapted to releasably mount the shaft to the rod and in substantial alignment with the axis of the stationary spool;
   a tube telescoped over the shaft for substantially free rotation thereon, the tube being adapted for rotatably receiving the supply spool telescoped over the tube;
   brake means carried by the tube and adapted to engage the supply spool to resist rotation of the latter relative to the tube; and
   a crank rigidly secured to the tube and extending radially therefrom for swinging about the shaft, the crank being positioned for engagement by the line extending from the supply spool to the stationary spool for simultaneous rotation of the crank, tube and supply spool on the shaft responsive to revolving of the line pick-up,
   said brake means being operable to permit relative rotation between the tube and the supply spool when a predetermined force is exerted on the line by the pick-up, whereby to accommodate for differential spool diameters during winding of the line from one spool to the other.

12. The invention of claim 11, wherein said brake means includes an abutment on the tube having a surface adapted to frictionally engage the supply spool, and a fastener releasably secured to the tube and disposed to exert a force against the supply spool for holding the latter against said surface.

13. The invention of claim 12, wherein said fastener is adjustable relative to the tube for selectively varying the frictional force between the supply spool and the abutment.

14. The invention of claim 13, wherein the tube is provided with external threads, and wherein the fastener includes a nut threadably engaged on the tube.

* * * * *